United States Patent [19]

Peer, Jr. et al.

[11] Patent Number: 4,544,597
[45] Date of Patent: Oct. 1, 1985

[54] CORRUGATED PAPER BOARD AND ITS METHOD OF MANUFACTURE

[75] Inventors: Albert D. Peer, Jr., Parker; Paul T. Obolewicz, Arvada, both of Colo.

[73] Assignee: Adolph Coors Company, Golden, Colo.

[21] Appl. No.: 441,277

[22] Filed: Nov. 12, 1982

[51] Int. Cl.⁴ .................... B32B 3/28; B32B 27/10
[52] U.S. Cl. .................... 428/182; 156/210; 428/186; 428/204; 428/209; 428/211
[58] Field of Search ............ 428/186, 182, 511, 187, 428/204, 209, 211; 156/210, 277; 283/56

[56] References Cited

U.S. PATENT DOCUMENTS 3,920,496 11/1975 Wilkinson et al. .............. 428/182
4,254,173 3/1981 Peer, Jr. ........................ 428/204
4,262,050 4/1981 Jenkins ........................... 428/186

FOREIGN PATENT DOCUMENTS 2421816 2/1979 France ............................ 428/204

*Primary Examiner*—Paul J. Thibodeau
*Attorney, Agent, or Firm*—Jerry W. Berkstresser; Bruce G. Klaas

[57] ABSTRACT

A decorative corrugated paper product having a pre-printed and/or decorated transparent plastic film adhesively applied to at least one side of facing sheet, the other side of which is adapted for subsequent adhesion to a fluted corrugated medium in the preparation of the corrugated product, wherein the printing and/or decoration is visable through the plastic film on the exterior of the facing sheet.

14 Claims, 3 Drawing Figures

4,544,597

CORRUGATED PAPER BOARD AND ITS METHOD OF MANUFACTURE

This invention relates to a method of producing corrugated paperboard wherein at least one of the facing sheets of the corrugated paperboard consists of a laminate of a plastic film adhesively affixed to a paper based material, and to the corrugated product.

Corrugated paperboard products are used extensively for a wide variety of packaging applications. These materials are characterized by their low cost, light weight and strength. A drawback to this material has been the difficulty and expense of providing corrugated packaging materials with a decorative outer surface. This has been sought because of the obvious marketing advantages. This requirement has not been fully met with the presently available corrugated paperboard products. In part this has been due to the fact that the paperboard products currently in use utilize an outer surface which must be prepared in a manner to be suitable for accepting printing and then the printing must be applied in a separate step in the preparation of the finished article, which is subsequent to the manufacturing of the corrugated paperboard itself. In other situations a preprinted bleached paper outer facing sheet has been provided in the manufacture of corrugated paperboard to produce an attractive product at a premium price. Many attempts have also been made to add water resistance to corrugated paperboard in an effort to extend its usefulness in environments where water resistance is required.

Typically, the provision of preprinted labels or other coating and printing have been attempted techniques after the corrugating manufacturing process which have either added an operation after the conversion of the corrugated paperboard into a carton, or the printing if previously applied, has been subjected to abrasion, dusting and defacement in the conventional corrugated making processes which invariably have rendered the product less attractive or produced less economical products. Exemplary of attempts to solve some of the aforementioned problems and others are described in the patents to Hintz et. al., U.S. Pat. No. 3,849,224, issued Nov. 19, 1974, and Wilkinson et. al., U.S. Pat. No. 3,920,490, issued Nov. 18, 1975. Further, printing a facing sheet on corrugated paperboard after manufacture, has tended to press and buckle the corrugated product, changing the caliper or thickness of the finished product and in some cases substantially adversely affecting the physical properties of the resultant corrugated product. This result can adversely affect the commercial viability of the product by making it necessary to choose heavier caliper components to counteract the weakness produced by the printing step.

It is therefore, an object of the present invention to provide a novel method of making a new corrugated paperboard product which has predictable strength, is economical and provides a decorative, moisture resistant product. It is desirable that the foregoing be accomplished without significantly altering conventional corrugated paperboard manufacturing equipment or processes, thus enabling high speed economical production of the improved product.

BRIEF SUMMARY OF THE INVENTION

The present invention utilizes a plastic and paper laminate, such as described in the patent to A. Dean Peer, Jr., U.S. Pat. No. 4,254,173, issued Mar. 3, 1981; as at least one of the facing sheets of a corrugated paperboard product. Such a laminated material can be employed in a pre-decorated form where the plastic is transparent and reverse printed on the side that is adhesively laminated to the paper substrate. In this manner, the exposed paper surface of the laminated facing sheet can then be adhesively afixed to the flutes of a corrugated paper during the fabrication of the corrugated paperboard to produce a pre-decorated, single or double faced corrugated product that does not require further printing. Preferably the laminated facing sheet is prepared from materials that in strength and thickness will be suitable for forming a corrugated paperboard product having the desired strength characteristics and still be flexible enough to be capable of being fed from a supply roll in the corrugating operation. If desired, the fabrication of the laminate can become an integral part of the corrugating method utilizing the process described in Peer, Jr., 4,254,173.

DETAILED DESCRIPTION OF THE INVENTION

The method of the present invention in its broadest sense is practiced by adhering a conventionally prepared, fluted, corrugated medium to the exposed paper surface of a plastic laminated facing sheet which comprises a reverse printed and/or metallized transparent plastic film, which has been adhesively applied to a paperboard or kraft paper base. The exposed paper base is glued or otherwise conventionally adhered to the corrugated medium to form a single or double faced corrugated paperboard product.

It has also been discovered that the laminated facing sheet can be prepared from inexpensive paperboard materials having less strength than would normally be required to make subsequently printed decorative corrugated paperboard products. In addition, conventional adhesives can be employed with the particular laminate selected without harming or otherwise disturbing the laminate or the pre-decorated reverse printing and/or metallizing which is viewable through the transparent plastic. Finally, it has been learned that the outer plastic surface can be selected from materials which resist skuffing or other deleterious marking during the manufacturing process thus producing a quality product while avoiding the need for subsequent printing steps.

BRIEF DESCRIPTION OF THE INVENTION

DETAILED DESCRIPTION OF THE DRAWINGS

Figure 1:
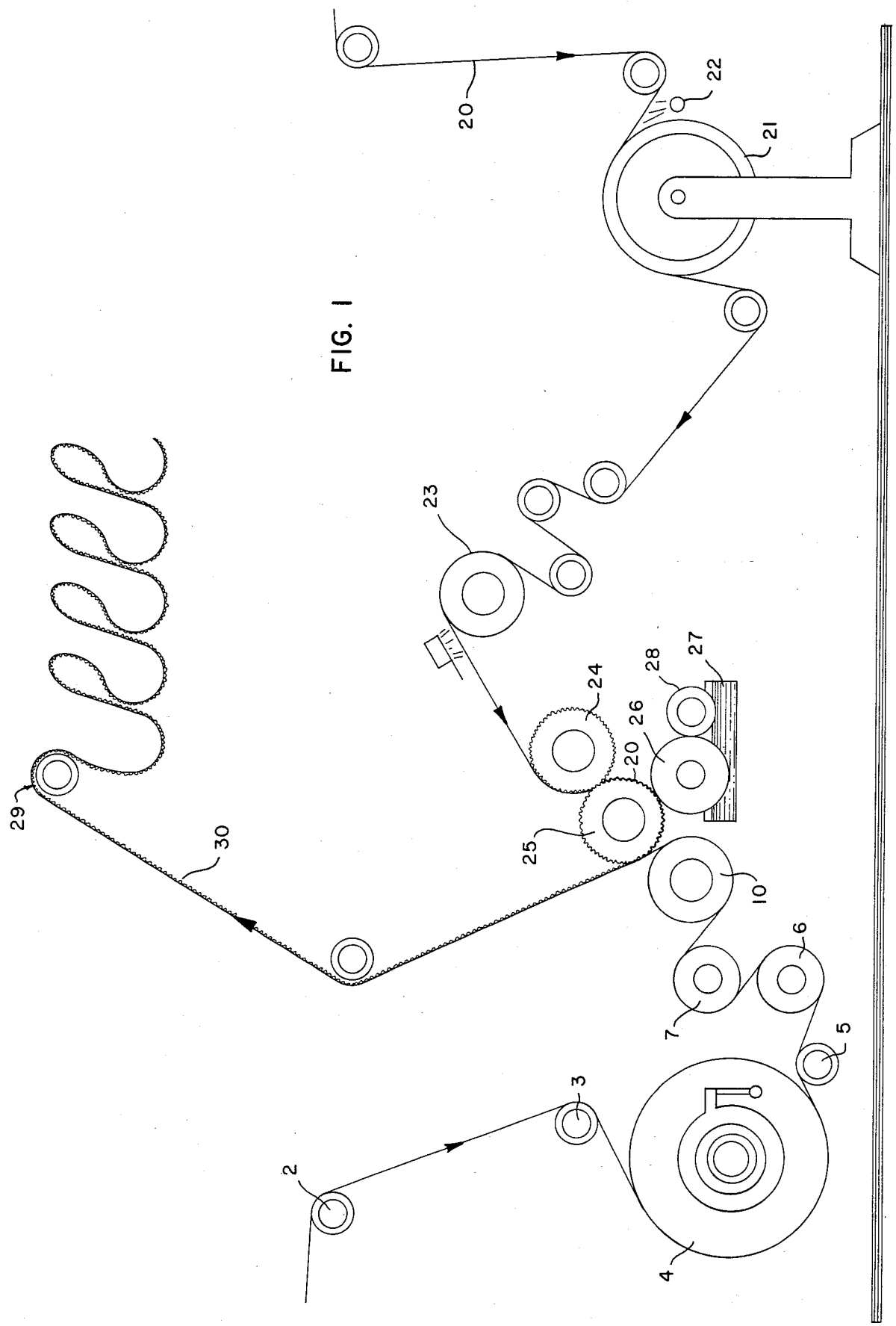
FIG. 1 is a schematic illustration of a typical corrugating operation for producing a single faced corrugated paperboard.
Figure 3:
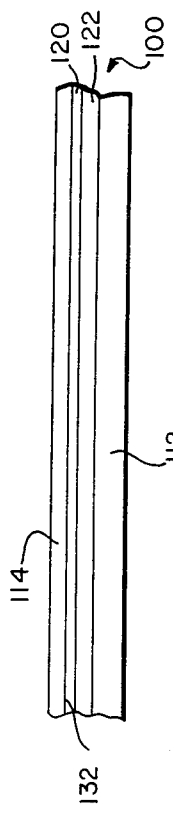
FIG. 3 is an enlarged side view of the composite facing material used in the process and product of the present invention.

In FIG. 1 a web of composite facing sheet material or conventional facing sheet material 1 shown in FIG. 3, is fed over rollers 2 and 3 and around a preheating roller 4 so as to present the exposed paper face 112 of the facing sheet material 1 into intimate contact with the heated face of the preheating roller 4.

The web 1 is then passed over take off roller 5 and around rollers 6 and 7 in a manner to adjust its speed for eventually matching with the speed of corrugated web 20. The web of facing sheet material 1 is then fed around pressure roller 10 which can adjustably provide for the proper contact between web 20 and web 1.

Web 20 which is the corrugating medium, is fed over a preconditioner roller 21, in the direction shown, which roller 21 supplies a predetermined amount of heat to the web 20. In addition, schematically at 22, steam is directed against the web 20 before the preconditioner roller 21, to impart the requisite amount of heat and moisture for the subsequent steps. The web of corrugating medium 20 is then fed over rollers 21, 22, and 23 and subject to further steam treatment before passing over upper corrugating roller 24 and lower corrugating roller 25.

A glue roller 26 is rotated in a bath 27 of adhesive with the excess glue on roller 26 being removed by a wiper roller 28. The flutes of the corrugated medium 20 engage the periphery of glue roller 26 before the corrugating medium 20 is intimately contacted with the web of facing sheet material 1 to form a single faced web 30 of corrugated paperboard.

Figure 2:
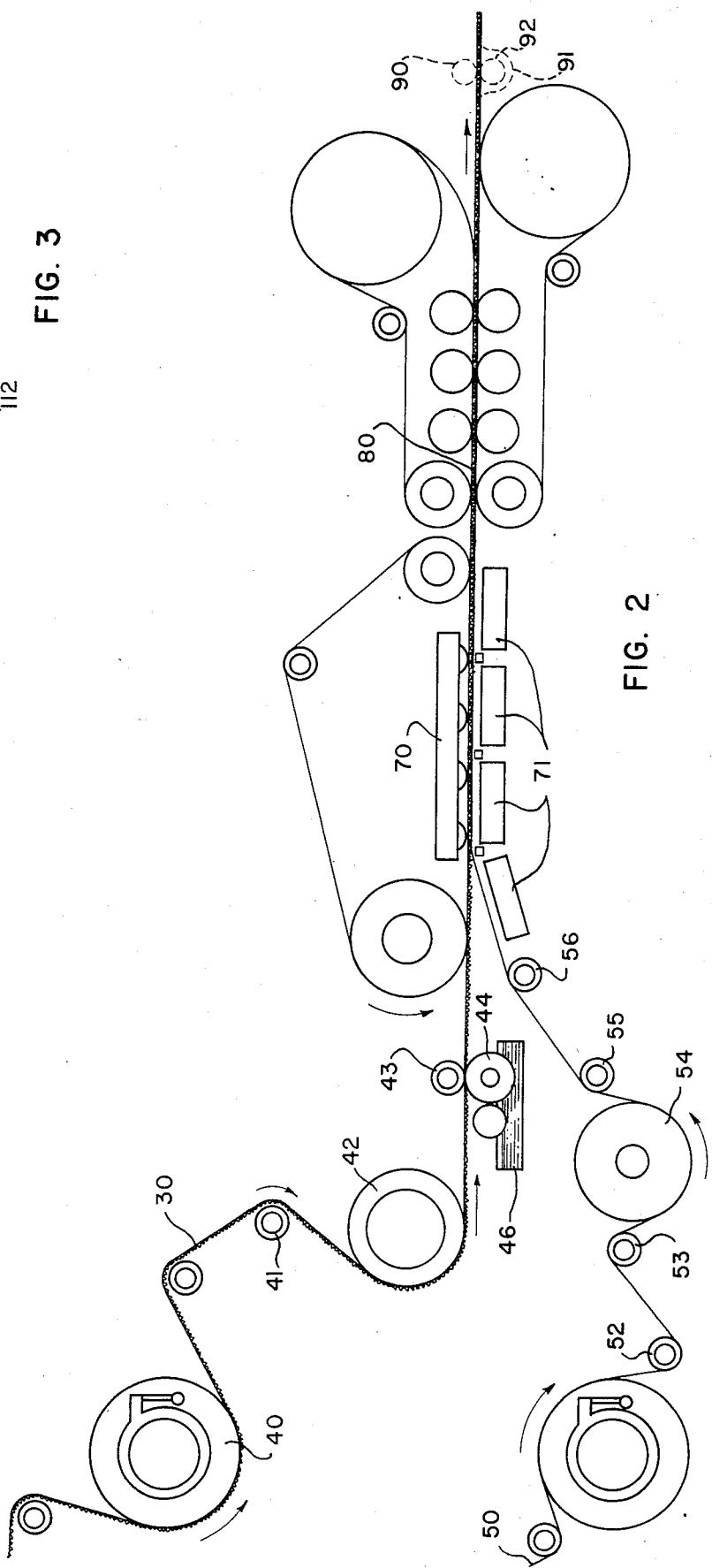
FIG. 2 is a schematic illustration of a typical corrugating operation for producing double faced corrugated paperboard.

In FIG. 2 a portion of the apparatus for making double faced corrugated is shown. A single faced web 30, prepared according to the description herein of FIG. 1 is fed around rollers 41 and 42 and then along the horizontal plane shown. A rider roller 43 assists contact of the tips of the flutes of the single faced corrugated web 30 against glue roller 44 in adhesive bath 45 containing wiper roller 46 functioning in a manner similar to that shown in FIG. 1.

A second facing web 50 of plastic laminated composite, as described herein, is passed over a preheating roller 51 over transport and guide rollers 52, 53, 54, 55, and 56 to preposition web 50 to come into speed registry and adhesive making contact with the preglued single faced corrugated web 30. The moving web 30 and moving web 50 are then held in registry by hold down rollers 70 until the adhesive bond is perfected by means of the heating elements 71. If cold glue is used there is no need for the heating elements. The unitary web 80 is then cooled while being held between the belts 81 and 82 and then slit or otherwise converted. The dotted line rollers at 90 and 91 (in bath 92) shows the typical point in the corrugating process where various kinds of coatings are conventionally applied for enhancing the printability of the outer surfaces of the corrugated paper board or to impart water resistant materials. In the process of the present invention, this step can be eliminated since one or both of the facing webs can be formed of the composite material of FIG. 3, where the transparent plastic film 114 is reverse printed with a printing layer 120 and laminated through an adhesive layer 122 to a paper substrate 112. Additionally, a metallized layer 132 may be affixed on portions of the back of transparent plastic film 114, as more fully described in the patent to A. Dean Peer, Jr., 4,254,173 issued Mar. 3, 1981. When selecting materials for use in the present invention, several considerations are important which will be described in detail hereinafter.

THE PAPER MATERIAL

As used herein, "paper or paperboard" refers to a web of cellulosic fibers in sheet form, ranging from 0.0015-0.030 in. (0.03-0.080 mm) in thickness and having a density of 5-129 lbs. per 1,000 square feet (0.02-0.63 kg/sq. in.). This includes paper, which is generally 0.0015-0.008 in. (0.030-0.20 mm) thick, and paperboard, which is generally 0.008-0.030 in. (0.20-0.8 mm) thick.

As stated previously, the selection of a particular paper stock for a facing sheet for the corrugated of the present invention, will depend on the properties desired in the finished product. The term "point" as generally understood in the industry and as used herein means a thickness of one thousandth of an inch for each point. Thus, 12 point paper is 0.012 in. (30.48 microns) thick. "Natural kraft paper" refers to kraft paper which has not been bleached to a white color or dyed. Kraft paper is paper produced by a chemical cooking process using sodium hydroxide and sodium sulfide. There are many different types of kraft paper manufactured with various additives and treatments for various applications, including the carrier board discussed above.

Another type of paper suitable for use as a composite facing sheet in the present invention is recycled paper. Recycled paper may be defined as paper material which has been made using fibers which have previously been used in a paper product. There are a number of different types of recycled paper, including so-called cartonboard, folding cartonboard, and chipboard. Chipboard is paperboard made from recycled materials that were not repulped into individual fibers but only broken down to fiber bundles and then manufactured into board. Recycled paper may be used in the present invention, because of the tear resistance contributed by the plastic film.

The main factors in the selection of a paper material for use in the present invention are its tensile load and its internal tearing resistance. All types of paper are generally high in tensile load. Tensile load refers to the amount of force which a sheet of paper can withstand without ripping or bursting. It can be accurately measured by the Tensile Strength test, ASTM D 828-60. Tensile load is similar to tensile strength except that tensile load will vary with the thickness of the sheet being tested.

The tensile load of the paper used in the present composite for example can be 40 lbs. MD (Machine Direction)/30 lbs. CD (Cross Direction) minimum (177.92 N MD/133.44 N CD) and 40 lbs. MD/30 lbs. CD minimum (177.92 N MD/133.44 N CD). In other words, the combined tensile load, MD+CD, for this material should be at least about 70, generally 70-90 lbs.

Since the plastic film used in the present composite is relatively elastic, the tensile load of the paper will typically contribute at least 85% of the tensile load of the composite. Internal tearing resistance refers to the average force in grams required to tear a single sheet of paper after the tear has been started. Internal tearing resistance is determined as described in TAPPI Standard T 414 ts-65 and Elmendorf, "Strength Test for Paper", Paper 26 (Apr. 21, 1930).

The internal tearing resistance, or tear strength, varies in a given paper sheet with the direction in which it is measured, being lower in the machine direction and higher in the cross machine direction. This is generally a result of the orientation of the paper fibers relative to the paper making machine from which the paper sheet issues. In some types of paper, such as that made by the Fourdrinier process, the tear resistance in the cross direction is generally 10-15% higher than that in the machine direction. In paper made with a cylinder machine, the tear resistance in the cross direction can be as high as four times that of the machine direction. In a wide variety of packaging applications, tear strength in both directions is important. Accordingly, the internal tearing resistance herein considered for use as a facing sheet for corrugated is the combined tear strength obtained by adding the tear strength in both directions.

Although not entirely so, the density, or basic weight and the thickness, or caliper of a facing sheet paper material are indicative of the material's strength and is related to the final strength of the corrugated. For example, 12 point carrier board having a basis weight of 42 lbs/1000 ft$^2$ (hereinafter 42#) will generally have a combined internal tearing resistance of 250 to 400 gms. Composite material as described herein when used as a facing sheet using 12 point 42# carrier board and 0.75 ml polyethylene film typically has a tensile strength of 50 lbs. MD and 30 lbs. CD and a combined tear resistance of 700 gms. A composite laminate facing sheet of 16 pt. 58#/42# carrier board and 0.75 ml polyethylene film has an approximate tensile strength of 55 lbs. MD/35 lbs. CD and combined tear resistance of 900 gms.

It has generally been found that the film of the composite provides at least a 40%, and often an 80-90%, increase in tear strength over the tear strength of the paper material used. In other words, assuming that the tear strength of the composite is the sum of the tear strengths of the two materials, the plastic may be said to provide at least about 28% of the composite tear strength. The reduction in tear strength made possible by the use of a composite laminate represents a considerable economic advantage, since tear strength, like stiffness, is closely related to the amount of fiber in the board, and hence its cost when used in making corrugated.

While the principal factors in the selection of the paper material for facing sheets are tensile load and internal tearing resistance, these factors must be considered, as stated previously, within the criterion of cost. Accordingly, other paper properties, as are known in the art, are also considered in the selection of the components of the corrugated. An important consideration in this regard is the moisture content which affects the price, shrinkage, warpage, and physical strength of the finished corrugated product. The paper material used in the composite facing sheet should have a moisture content in the range of 4.0-8.5%.

It is significant that the use of a composite facing that in corrugated permits the use of paper having a tear strength less than that of conventionally used facing sheets, and that the strength provided by the plastic film is sufficient for web handling during the manufacturing process. The use of a composite facing sheet is also advantageous in that no lacquer overcoat is required to impart a high gloss effect to the finished product.

THE PLASTIC FILM

The plastic film used in the composite facing sheet for the corrugated of the present invention provides a means for imparting additional tear strength and wet strength to the corrugated packaging material and a means for protecting the printing or other decoration underneath. Typically, it has been found that the specific polymer used is not critical to the functions of the plastic film. Thus films of polyethylene terpthalate, polyethylene, polyvinyl chloride, polypropylene, and cellophane have been evaluated and found satisfactory in some applications. Polyvinyl chloride and polypropylene are less favored, however, as requiring more closer controlled manufacturing techniques to produce films of sufficient clarity. It has also surprisingly been found that the thickness of the film is not critical to the functions of the film in imparting the desired properties to the corrugated facing sheet. Thicknesses from 0.25-2.0 mils can be employed in the composite used. Generally, however, films of about 0.75 mils thickness are preferred.

An important physical property contributed by the plastic film is it tear resistance. The tear resistance of plastic film is variable with direction in the film depending on whether or not and in which direction the film is oriented. In oriented films, the polymer chains tend to be aligned along the direction of orientation and the tear strength will be proportional to the degree of orientation achieved. The orientation direction and magnitude of a film is a function of the method by which the film was produced. Unoriented film may be made by extrusion processes including tubular die blown, cast, and slit die processes.

It has been found, for purposes of the present invention, that both oriented and unoriented films will fulfill the function of the plastic films as the carrier of a decorative print and/or metallized surface. Therefore, the preferred films for the present invention have been selected on an economic basis. The presently preferred plastic films are tubular die blown polyethylene and polypropylene. Polyethylene is also preferred as imparting a high gloss to the composite material and being amenable to radiation-induced crosslinking which can improve the adhesion of dyes and metal film.

The selection of a type of polymer film produced to a certain thickness by a particular process will, apart from economic considerations, primarily be determined by the tear resistance of the film. The following films provide the necessary tear resistance and have been found structurally satisfactory in the composite facing sheet:

| Material | Load, lb (N) MC/CD, ASTM D882 | Tear Resistance MD/CD ASTM D1922 |
| --- | --- | --- |
| POLYETHYLENE, | | |
| Consolidated Thermoplastic Co., LGF11, .75 mil, | 1.16/0.80 (5.15/3.55)N | 238/120 |
| 1.0 mil. | 1.44/0.86 (6.40/3.82)N | 282/254 |
| POLYPROPYLENE, | | |
| Hercules Chem. Corp. B503 .5 mil | 5.01/4.69 (22.28/20.86)N | 8/6 |
| .25 mil | 14.81/11.63 | 10/13 |
| $^2$POLYETHYLENE TERTHALATE, | | |
| Celenese Corp., .48 mil | 4.66/5.08 (20.72/22.59)N | 8/10 |
| .92 mil | — | 16/16 |
| CELLOPHANE | | |
| Dupont, 75 LBT, .75 mil | 6.48/8.60 (28.82/38.25)N | 13/20 |
| VINYL, | | |
| Goodyear, LPC-60 .60 mil | 1.23/0.79 (5.47/3.51)N | 693/376 |
| ALC - | | |
| 75, .75 mil | 1.47/1.13 (6.53/5.02)N | 734/446 |

It has been found that the tear strength of the composite facing sheet is in excess of that expected from an addition of the tear strengths of the plastic film and the paper. While not completely understood, it is thought that the interface between the paper material, adhesive, and reverse printed and/or metallized film provides an unexpected increase in some of the properties of the corrugated product. Thus there has been provided a composite facing sheet material which is durable and lower cost than conventionally used facing materials. The composite facing material provides a glossy, more attractive appearance and permits a variety in printing or decoration, such as foil appearance imparted by conventional metallizing processes, and is highly abrasion resistant as well as imparting high wet strength, which is an important consideration in the manufacture of corrugated and in the finished product. The manufacturing of the present composite can utilize polyethylene film with radiation treatment and molten polyethylene adhesive for further cost savings.

OPERATION

During the process of preparing single faced corrugated paper board the driven rolls 4 and 10 pulls the web 1 of either plain facing stock or composite stock from a supply roll (not shown) and onto the preheater roller 4 where the temperature is raised a predetermined amount sufficient to facilitate the bonding of the web 1 to the corrugated medium 20 to form the single faced corrugated web 30. The corrugated medium 20 is also pulled by driven rolls 23, 24, 25, and 29 through the steam shower at 22 and the preconditioner roll 21 which adds moisture and heat to the medium in a predetermined conventional manner to enable the two corrugator rolls 24 and 25 to impart the characteristic flutes to the medium by the positioning of the fluted rolls in registry with sufficient clearance therebetween to press the softened medium into the proper corrugated configuration. The preheated facing material is pressed into contact with the flutes on the medium while they are still engaged in the flutes of the corrugating roller and after adhesive has been applied to the tips of the flutes which come into contact with the paper face of the facing web 1. It is important that the pressure of the contact, the moisture content of the web 1 and the setting time for the adhesive be adjusted to provide for a sufficiently strong bond to set the flutes in the form imparted by the corrugating rolls.

The adhesive used to bond the medium to the facing sheet can be the conventional mixture of approximately 20% by weight of corn starch and 80% by weight of water. Since this mixture must be heated under pressure to become adhesive the aforementioned criteria must be balanced to insure a proper bond with the medium and with the reduced moisture content facing sheet in order to prevent warping. The looped representation of the single faced web in FIG. 1 is referred to in this art as a bridge which allows some time for the starch bond to setup properly as well as providing for a storage area for differences in speed when double faced corrugated is made from the single faced material as shown in FIG. 2 and described herein. In FIG. 2, if a double faced corrugated paper product is desired, it can be formed by the additional steps shown. The cooled adhesively bonded single faced web from the bridge, can be pulled over a preheater roll 40 by means of driven roll 42 after which more adhesive is applied to the tops of the flutes formed in the single facing operation. A web 50 of either paper facing material or composite facing material is then pulled from a supply roll (not shown) over a preheater roll by driven roll 54, until it comes into adhesive registry and contact with the prepared single faced corrugated. The subsequent operations involving setting the adhesive by heat and pressure, subsequent cooling and covertion operations are conventional with the notable exception that no subsequent coating operations may be required for moisture resistance (if both of the facing sheets are composite laminates) and no further special preparations are required for graphics since the graphics are already in place in the composite facing sheet. As previously described warping and bonding problems can occur if either the corrugating medium or the facing sheets are either too wet or moist or too dry. It has been learned that, surprisingly, the moisture content of the paper substrate of the composite facing can be between 5 and 20 and still achieve a satisfactory bond to the corrugating medium.

Several other advantages have been obtained with the practice of the present invention. For example, it has been learned that the use of a preformed composite facing sheet containing polyethylene which is back printed and/or metallized and adhesively applied to a suitable paper substrate can be run on a hot corrugator. That is, at the temperatures which provide for an adequate set for the adhesive selected to bond the flutes of the corrugated to the exposed paper back of the composite facing sheet.

In practice this bonding can occur at temperatures between 250° F. (121° C.) and 300° F. (150° C.). Optionally, a cold set adhesive may be employed if desired. As previously discussed, starch based adhesive formulations can be employed, as are used conventionally as well as casein and contact adhesives including several formulations commercially available from the H. B. Fuller Company of St. Paul, Minn. and National Starch. Also employed are adhesives utilizing polyvinyl acetate and polyvinyl alcohol in emulsion form typically combined with resins and tackifiers for the particular properties required for conventional corrugating processes.

As previously described, the process and article of the present invention is superior to the use of a preprinted bleached paper facing sheet in its ability to remain attractive and unsoiled during the subsequent operations encountered in the manufacture of corrugated. Likewise, the provision of a preprinted white paper label after the corrugated is made, requires sheet feeding equipment and adhesive application in separate additional process steps. Both of the foregoing add unwanted cost to the finished packaging material.

It is of primary importance, to understand the contribution made by the present invention, to appreciate that the step of printing finished corrugated is deleterious to its strength. When the corrugated is run between a printing roller and a back-up roller, the nip pressures must be great enough to provide a proper transfer of ink to form a legible, attractive printed surface, whether on a bleached facing sheet, a clay coated facing sheet or a facing sheet of normal brown corrugated stock.

It is typically believed in the industry that the printing step significantly reduces the strength of the finished corrugated from the strength it would have had if it had not been printed. There may be as much as a 10% to 20% loss of strength in a corrugated product that is printed after manufacture.

Several reasons have been advanced for this phenomenon. As can be seen from the data tabulated in TABLE I, the reduction in thickness or caliper, of a single wall or double wall corrugated, which is produced by the act of printing, can be significant.

TABLE I

| Test | Flute | UNPRINTED Min. | UNPRINTED Max. | PRINTED Flexo. Min. | PRINTED Letterspress Min. |
|---|---|---|---|---|---|
| SINGLE-WALL | | | | | |
| 125 lb. | B | .105 | .112 | .099 | .094 |
| 125 lb. | C | .143 | .154 | .137 | .132 |
| 150 lb. | B | .108 | .115 | .102 | .097 |
| 150 lb. | C | .146 | .157 | .140 | .135 |
| 175 lb. | B | .110 | .117 | .104 | .099 |
| 175 lb. | C | .148 | .159 | .142 | .137 |
| 200 lb. | B | .112 | .119 | .106 | .101 |
| 200 lb. | C | .150 | .161 | .144 | .139 |
| 250 lb. | B | .118 | .126 | .112 | .107 |
| 250 lb. | C | .156 | .168 | .150 | .145 |
| 275 lb. | B | .126 | .134 | .120 | .115 |
| 275 lb. | C | .164 | .176 | .158 | .153 |
| 300 lb. | B | .130 | .138 | .124 | .119 |
| 300 lb. | C | .167 | .180 | .161 | .156 |
| 350 lb. | B | .134 | .143 | .128 | .123 |
| 350 lb. | C | .172 | .185 | .166 | .161 |
| Doublewall | | | | | |
| 200 lb. | B-C | .240 | .257 | .234 | .246 |
| 275 lb. | B-C | .245 | .262 | .239 | .251 |
| 350 lb. | B-C | .254 | .272 | .248 | .261 |
| 400 lb. | B-C | .261 | .279 | .255 | .268 |

This reduction in thickness can manifest itself in two ways; first, the crushing, creasing and general collapse of the corrugating flutes from their formed position and perhaps the breaking of some of the adhesive bonds between the tips of the corrugating flutes and the facing sheets. Both of these results of the printing operation tend to weaken the corrugated structure and may require a heavier caliper of material to be used for a particular application where printed corrugated is used instead of unprinted. In TABLE II a study shows the correlation between caliper loss due to printing crush and the loss of compression strength for a C-flute corrugated.

TABLE II

| Caliper Loss Due To Printing Crush | Compression Loss Due To Crush |
|---|---|
| 0 | 0 |
| .010 inch | 9% |
| .020 inch | 19% |
| .030 inch | 28% |
| .040 inch | 38% |

The foregoing description of a novel corrugated product and the process for its manufacture is exemplary only. The product and process may be modified within the spirit of the invention which should only be restricted in scope by the prior art as that affects the scope of the appended claims.

What is claimed is:

1. A decorative preprinted corrugated paperboard product comprising:
   a fluted paperboard corrugated medium and at least one paperboard facing sheet adhesively attached thereto; said one paperboard facing sheet comprising a single sheet containing two surfaces, with a first inner surface adhesively bonded to the fluted paperboard corrugated medium and a second outer surface adhesively bonded to a reverse printed plastic film.

2. The decorative, printed corrugated paper product of claim 1 wherein said plastic film is selected from the group consisting of polyethylene terphthlate, polypropylene, polyvinylchloride and cellophane.

3. The product of claim 2 wherein the plastic film is polyethylene.

4. The product of claim 2 wherein the plastic film is polyethylene terphthlate.

5. The decorative printed corrugated paper product of claim 2 wherein a second paperboard facing sheet is adhesively adhered to the tips of another side of the fluted corrugated medium to form a double faced corrugated paper product having decorative printing visible through the plastic film on the exposed side of the first facing sheet.

6. The decorative, printed corrugated product of claim 2 wherein said plastic film contains at least some metallized surface area visible through said film.

7. The decorative, printed corrugated product of claim 5 wherein said plastic film contains at least some metallized surface area visible through said film.

8. A method of producing a preprinted corrugated paper product suitable for use as a packaging material containing the steps of:
   (1) preparing a paper facing sheet for use in the preparation of a corrugated paper product, said facing sheet comprising a single sheet containing two sides, at least one of said paperboard sides having adhesively bonded thereto a transparent reverse printed, plastic film, wherein the printing is visible through the plastic film when the film is adhered to first side of said facing sheet;
   (2) preparing a fluted corrugated medium having two sides;
   (3) adhesively attaching the tips of the flutes on one side of the fluted corrugating medium to the second of the sides of the facing sheet, so as to form a preprinted corrugated product.

9. The method of claim 8 wherein the transparent reverse printed plastic film adhesively bonded to one side of the facing sheet is selected from the group consisting of polyethylene, polypropylene, polyethylene terphthalate, polyvinylchloride and cellophane.

10. The method of claim 9 wherein the plastic film is polyethylene.

11. The method of claim 10 wherein the plastic film is polyethylene terphthalate.

12. The method of claim 8 wherein the reverse printed plastic contains at least some metallized areas.

13. A decorative preprinted corrugated paperboard product made of a plurality of preselected paperboard components and having a greater strength than a product made from the same preselected paperboard components comprising:
   a fluted paperboard corrugated medium of preselected caliper and basis weight and at least one paperboard facing sheet having a preselected caliper and basis weight adhesively attached thereto, said one paperboard facing sheet comprising a single sheet containing two surfaces, a first inner surface being adhesively bonded to the fluted paperboard corrugated medium and a second outer surface containing a reverse printed plastic film adhesively bonded to the said second outer surface of the paperboard facing sheet so as to form a said decorative corrugated paperboard product capable of being used as a preprinted packaging material without further printing.

14. A method of producing a preprinted corrugated paper product suitable for use as a packaging material containing the steps of:
1. preparing a paper facing sheet for use in the preparation of a corrugated paper product, said paper facing sheet comprising a single sheet containing two sides, at least one of said sides having adhesively bonded therto a transparent reverse printed, plastic film, wherein the printing is visible through the plastic film when the film is adhered to first side of said facing sheet;
2. preparing a fluted corrugated medium having two sides;
3. adhesively attaching the tips of the flutes on one side of the fluted corrugated medium to the second of the sides of the facing sheet, so as to form a preprinted corrugated product; and
4. affixing a second paper facing sheet to the tips of the flutes on the other side of the fluted corrugated medium to thereby form a double faced corrugated paper product having printing visible on one face and not requiring further printing.

* * * * *